US012354795B2

(12) United States Patent
Brophy et al.

(10) Patent No.: US 12,354,795 B2
(45) Date of Patent: Jul. 8, 2025

(54) SOLENOID SYSTEMS AND METHODS FOR ACHIEVING LOWER COST

(71) Applicant: Tyco Fire & Security GmbH, Neuhausen am Rheinfall (CH)

(72) Inventors: Christopher Brophy, Cedarburg, WI (US); Jason Raasch, Cedarburg, WI (US); Kevin Dixon, Milwaukee, WI (US)

(73) Assignee: TYCO FIRE & SECURITY GMBH, Neuhausen am Rheinfall (CH)

(*) Notice: Subject to any disclaimer, the term of this patent is extended or adjusted under 35 U.S.C. 154(b) by 363 days.

(21) Appl. No.: 17/716,668

(22) Filed: Apr. 8, 2022

(65) Prior Publication Data

US 2023/0326643 A1 Oct. 12, 2023

(51) Int. Cl.

| | |
|---|---|
| ***H01F 7/06*** | (2006.01) |
| ***F24F 11/88*** | (2018.01) |
| ***F24F 13/14*** | (2006.01) |
| ***H01F 7/10*** | (2006.01) |

(52) U.S. Cl.

CPC .............. *H01F 7/064* (2013.01); *F24F 11/88* (2018.01); *F24F 13/1426* (2013.01); *H01F 7/06* (2013.01); *H01F 7/10* (2013.01)

(58) Field of Classification Search

CPC ...... H01F 7/064; H01F 7/10; H01F 2007/185; H01F 7/06; H01F 27/28; H01F 7/16; H01F 7/18; H01F 7/1844; F24F 13/1426

USPC .......................................................... 361/160

See application file for complete search history.

(56) References Cited

U.S. PATENT DOCUMENTS

| | | | | |
|---|---|---|---|---|
| 5,178,053 | A * | 1/1993 | Rudich, Jr. | F15B 9/03 91/361 |
| 5,910,890 | A * | 6/1999 | Hansen | H01H 47/325 363/41 |
| 6,057,682 | A * | 5/2000 | McCurley | G01D 5/145 324/207.2 |
| 6,176,208 | B1 * | 1/2001 | Tsuzuki | F01L 9/20 123/90.11 |
| 7,505,877 | B2 | 3/2009 | Salsbury | |
| 2010/0206990 | A1 * | 8/2010 | Petrenko | B64D 15/163 62/331 |
| 2012/0306218 | A1 * | 12/2012 | Bodnar, Jr. | H02P 9/04 290/40 B |
| 2017/0092406 | A1 * | 3/2017 | Chu | H01F 7/1607 |
| 2019/0078700 | A1 * | 3/2019 | Kanai | H01F 7/18 |
| 2021/0123696 | A1 * | 4/2021 | Johnson | F16D 55/227 |

* cited by examiner

*Primary Examiner* — Danny Nguyen
(74) *Attorney, Agent, or Firm* — Foley & Lardner LLP

(57) ABSTRACT

An actuator includes a solenoid including a coil and a plunger, a switch circuit coupled to the coil, and a control circuit coupled to the switch circuit. The control circuit is configured to receive a feedback signal representative of a plunger position. The control circuit is also configured to provide power to the solenoid via the switch circuit and reduce power to the solenoid via the switch circuit in response to the feedback signal being representative of the plunger being in a full travel position.

21 Claims, 5 Drawing Sheets

SOLENOID SYSTEMS AND METHODS FOR ACHIEVING LOWER COST

BACKGROUND

The present disclosure relates to solenoids and methods of controlling solenoids, including but not limited to solenoids which are capable of being powered by a diverse range of supply voltages which may be either alternating or direct current-based. Examples of such applications include solenoids which provide pneumatic or hydraulic flow control for industrial processes, machine motion control, pressure regulation, control of heating, ventilation, and/or air-conditioning (HVAC) devices, control of equipment for leak-testing pressure-bearing hardware and the like.

In some applications, solenoids are used in HVAC devices of HVAC systems or components thereof. HVAC devices include air inlets, filters, dampers, fans, humidifiers, heating and/or cooling coils, roof top units, variable air volume boxes, air handling units, air conditioners, heat pumps, furnaces, boilers, air outlets, ducts, electrical elements, outdoor units, compressors, and blowers. Solenoids are generally electronic devices that include a coil of wire in cylindrical or other form. When current is provided through the coil, a magnetic field generated by the coil causes a movable core or other element to be drawn into the coil or otherwise moved. Actuators and valves associated with HVAC devices often include a solenoid that moves at a speed and/or torque which can be controlled by varying pulse width, frequency and/or voltage of a signal supplied to the solenoid. The solenoid can be used as a switch or control for any type of mechanical device (such as a valve, damper, etc.) In an example, an actuator including a solenoid may be configured to control the movement of a damper within a duct. Solenoids add to the cost of HVAC devices.

SUMMARY

This summary is illustrative only and is not intended to be in any way limiting. Other aspects, inventive features, and advantages of the devices or processes described herein will become apparent in the detailed description set forth herein, taken in conjunction with the accompanying figures, wherein like reference numerals refer to like elements.

Some embodiments relate to a heating, ventilation, or air conditioning (HVAC) actuator. The actuator includes a solenoid including a coil and a plunger, a switch circuit coupled to the coil, and a control circuit coupled to the switch circuit. The control circuit is configured to receive a feedback signal representative of a plunger position. The control circuit is also configured to provide power to the solenoid via the switch circuit and reduce power to the solenoid via the switch circuit in response to the feedback signal being representative of the plunger being in a full travel position.

In some embodiments, the feedback signal is from a current sense resistor. In some embodiments the feedback signal is from a secondary coil of the solenoid. In some embodiments, the feedback signal is from mechanical or optical sensor. In some embodiments, the control circuit provides foldback when current in the solenoid reaches saturation. In some embodiments, the coil is an aluminum wire coil.

In some embodiments, the actuator further includes a rectifier. The rectifier is configured to convert an alternating current input signal to a direct current signal. The rectifier is configured to receive any of an alternating current signal at 120 volts, 240 volts, or 85 volts and provide the direct current signal. In some embodiments, the direct current signal is provided to the coil.

Some embodiments relate to a solenoid system. The solenoid system includes an alternating current input configured to receive voltages. The alternating current input is configured to receive any of an alternating current signal at 120 volts, 240 volts, or 85 volts. The solenoid system also includes a solenoid including a coil and a plunger, a switch circuit coupled to the coil, and a control circuit coupled to the switch circuit. The control circuit is configured to receive power from the alternating current input and provide power to the solenoid via the switch circuit.

In some embodiments, the control circuit is configured to receive a feedback signal representative of a plunger position and is configured to provide the power to the solenoid via the switch circuit and reduce the power to the solenoid via the switch circuit in response to the feedback signal being representative of the plunger being in a full travel position. In some embodiments, the solenoid system is disposed in an HVAC actuator configured as a linear actuator. In some embodiments, a rectifier is coupled to the alternating current input. The rectifier is configured to convert the alternating current input signal to a direct current signal. The rectifier is configured to receive any of the alternating current signal at 120 volts, 240 volts, or 85 volts and provide the direct current signal.

In some embodiments, the control circuit includes a voltage to frequency converter. In some embodiments, the control circuit includes a microcontroller. In some embodiments, the control circuit includes a flyback controller. In some embodiments, the control circuit includes a parallel resistor capacitor circuit Some embodiments relate to heating, ventilation, or air conditioning (HVAC) actuator. The actuator includes a solenoid including a coil and a plunger. The coil includes an aluminum conductor. The actuator also includes a switch circuit coupled to the coil and a control circuit coupled to the switch circuit. The control circuit is configured to receive a feedback signal and to provide power to the solenoid via the switch circuit. The control circuit is configured to reduce power to the solenoid via the switch circuit in response to the feedback signal to reduce power consumed after in-rush current is received.

In some embodiments, the feedback signal is representative of a plunger position. In some embodiments, the feedback signal is from a current sense resistor, a secondary coil of the solenoid, a mechanical sensor, or an optical sensor. In some embodiments, the control circuit provides foldback when current in the solenoid reaches saturation.

In some embodiments, a controller is coupled to the solenoid and is configured to receive at least one of current and position data relating to operation of a solenoid plunger and provide a control signal to the solenoid. In some embodiments, the controller and the solenoid are disposed within a single housing.

BRIEF DESCRIPTION OF THE DRAWINGS

Various objects, aspects, features, and advantages of the disclosure will become more apparent and better understood by referring to the detailed description taken in conjunction with the accompanying drawings, in which like reference characters identify corresponding elements throughout. In the drawings, like reference numbers generally indicate identical, functionally similar, and/or structurally similar elements.

DETAILED DESCRIPTION

Figure 1:
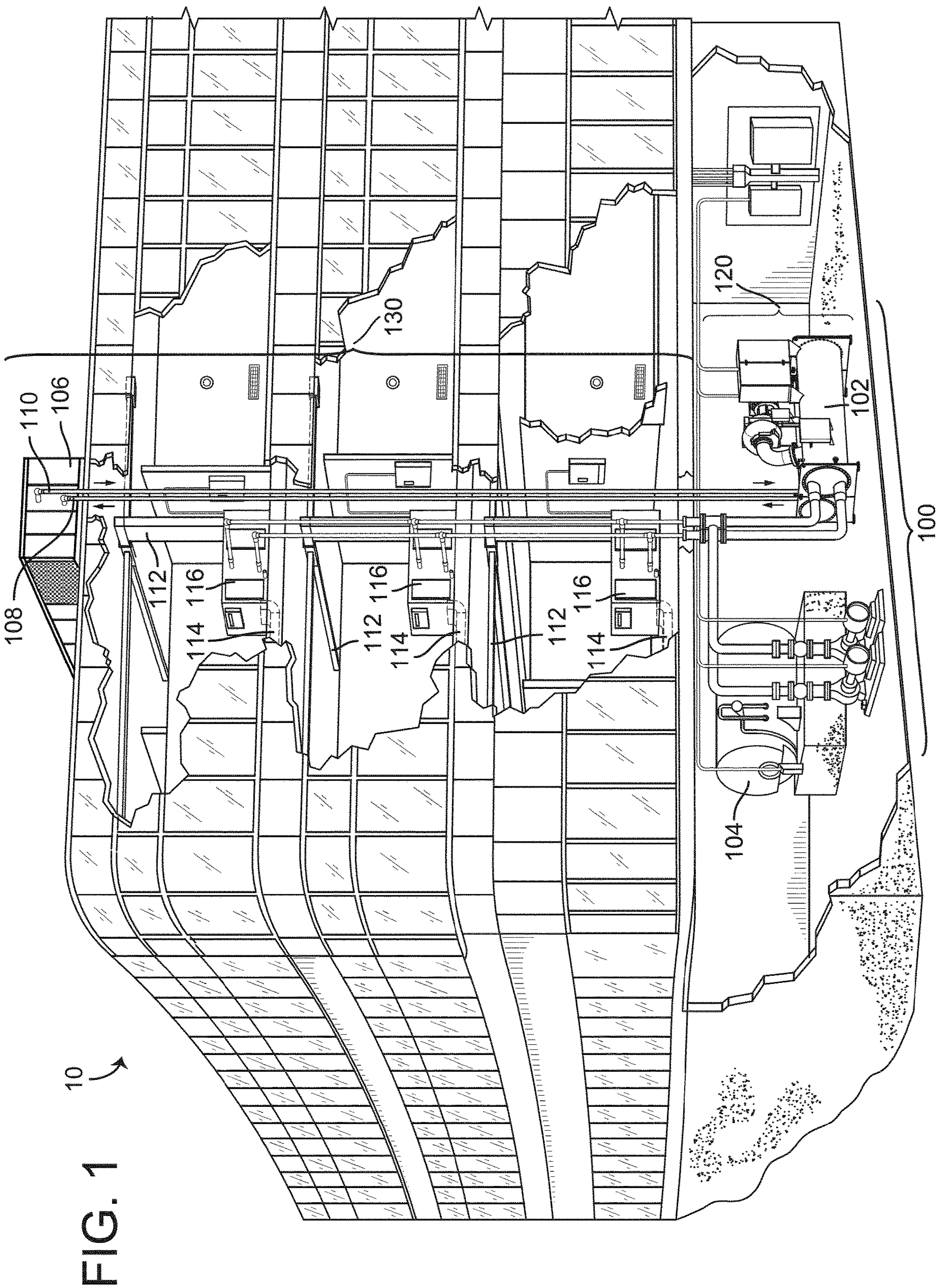
FIG. 1 is a perspective view of a building including a heating, ventilating, or air conditioning (HVAC) system, according to some embodiments.

Before turning to the figures, which illustrate certain exemplary embodiments in detail, it should be understood that the present disclosure is not limited to the details or methodology set forth in the description or illustrated in the figures. It should also be understood that the terminology used herein is for the purpose of description only and should not be regarded as limiting.

Overview

Referring generally to the figures, the systems and methods disclosed herein generally refer to embodiments of a solenoids for HVAC devices and other devices. Solenoids are provided in a variety of forms to accommodate mechanical and geometrical requirements of devices, electrical requirements, and force and movement requirements (stroke, torque, etc.) For example, solenoids in HVAC devices are often designed for one of several voltage inputs (e.g., 120, 208, 240, and 277 volts alternating current (VAC)). In some embodiments, systems and methods advantageously provide for a solenoid that can be used with a control circuit receiving various input voltages between a range of 85-304 VAC. Such a solenoid system can be used to reduce the number of HVAC device model stock keeping units (SKUs) because an HVAC device with the solenoid system operable over the large input voltage range can replace four HVAC devices which include a different solenoid for each voltage input (e.g., 120 VAC, 208 VAC, 240 VAC, and 277 VAC). For example, a universal solenoid system can replace four (4) existing SKUs, one for each of the 120 VAC, 208 VAC, 240 VAC, and 277 VAC inputs. In some embodiments, systems and methods advantageously provide for a solenoid that can be used with various input voltages between a range of 24 VAC and 120 VAC. In some embodiments, systems and methods advantageously provide for a wider input voltage range (e.g., 24 VAC to 480 VAC) which further reduces SKUs. Reduction of SKUs reduces HVAC device costs caused due to different solenoid designs.

In some embodiments, solenoids are designed to reduce copper usage or wire requirements. Systems and methods can employ an advantageous feedback and regulation mechanism that allows for reduction in copper wire and reduction of SKUs. In some embodiments, copper wire is reduced by rectifying or otherwise regulating the voltage/current to the solenoid coil, thus regulating the magnetic field. In addition, heat and winding count can be reduced by employing a circuit whereby the initial/inrush current/magnetic field is sufficient to actuate the solenoid plunger and is further reduced after actuation based on position and/or expected actuation time constant.

In some embodiments, cost-reducing control schemes include using a half-wave rectification topology with free-wheeling diode (with optional current-sense and/or voltage feedback within free-wheeling loop/circuit), having a universal input voltage power supply with parallel resistor-capacitor (RC) circuit, using voltage-to-frequency converter with field effect transistor (FET) topology (e.g., taking advantage of the linear relationship between frequency and magneto-motive force), and triac/silicon controlled rectifier (SCR) control with feedback. Feedback mechanisms can include a hall-effect sensor (overall magnetic field and/or actuator position), auxiliary winding(s) on the solenoid bobbin, and/or a current-sense element (i.e. series resistor). Additionally, an infrared transmitter/detector pair can be used to detect plunger position and used as control feedback. The current measured is compared to a nominal limit and used for foldback when the solenoid reaches saturation and/or plunger position in an advantageous control schema according to some embodiments.

In some embodiments, aluminum conductors are used in place of copper for further cost reduction. In some embodiments, a motor with lead screw is used instead of a solenoid.

Building HVAC System

Referring now to FIG. 1, a perspective view of a building 10 is shown. Building 10 is served by a heating, ventilating, or air conditioning (HVAC) system 100. HVAC system 100 can include a number of HVAC devices (e.g., heaters, chillers, air handling units, pumps, fans, thermal energy storage, etc.) configured to provide heating, cooling, air conditioning, ventilation, and/or other services for building 10. For example, HVAC system 100 is shown to include a waterside system 120 and an airside system 130. Waterside system 120 may provide a heated or chilled fluid to an air handling unit of airside system 130. Airside system 130 may use the heated or chilled fluid to heat or cool an airflow provided to building 10. The HVAC devices can include solenoid systems for moving mechanical components.

HVAC system 100 is shown to include a chiller 102, a boiler 104, and an air handling unit (AHU) or a rooftop air handling unit (RTU) 106. Waterside system 120 may use boiler 104 and chiller 102 to heat or cool a working fluid (e.g., water, glycol, etc.) and may circulate the working fluid to RTU 106. In various embodiments, the HVAC devices of waterside system 120 can be located in or around building 10 (as shown in FIG. 1) or at an offsite location such as a central plant (e.g., a chiller plant, a steam plant, a heat plant, etc.) that serves one or more buildings including building 10. The working fluid can be heated in boiler 104 or cooled in chiller 102, depending on whether heating or cooling is required in building 10. Boiler 104 may add heat to the circulated fluid, for example, by burning a combustible material (e.g., natural gas) or using an electric heating element. Chiller 102 may place the circulated fluid in a heat exchange relationship with another fluid (e.g., a refrigerant) in a heat exchanger (e.g., an evaporator) to absorb heat from the circulated fluid. The working fluid from chiller 102 and/or boiler 104 can be transported to AHU or RTU 106 via piping 108.

RTU 106 may place the working fluid in a heat exchange relationship with an airflow passing through RTU 106 (e.g., via one or more stages of cooling coils and/or heating coils). The airflow can be, for example, outside air, return air from within building 10, or a combination of both. AHU or RTU 106 may transfer heat between the airflow and the working fluid to provide heating or cooling for the airflow. For example, RTU 106 can include one or more fans or blowers configured to pass the airflow over or through a heat exchanger containing the working fluid. The working fluid may then return to chiller 102 or boiler 104 via piping 110.

Airside system 130 may deliver the airflow supplied by RTU 106 (i.e., the supply airflow) to building 10 via air supply ducts 112 and may provide return air from building 10 to RTU 106 via air return ducts 114. In some embodiments, airside system 130 includes multiple variable air volume (VAV) units 116. For example, airside system 130 is shown to include a separate VAV unit 116 on each floor or zone of building 10. VAV units 116 can include dampers or other flow control elements that can be operated to control an amount of the supply airflow provided to individual zones of building 10. In other embodiments, airside system 130 delivers the supply airflow into one or more zones of building 10 (e.g., via supply ducts 112) without using intermediate VAV units 116 or other flow control elements. RTU 106 can include various sensors (e.g., temperature sensors, pressure sensors, etc.) configured to measure attributes of the supply airflow. RTU 106 may receive input from sensors located within AHU or RTU 106 and/or within the building zone and may adjust the flow rate, temperature, or other attributes of the supply airflow through RTU 106 to achieve set point conditions for the building zone.

An HVAC Actuator

Figure 2:
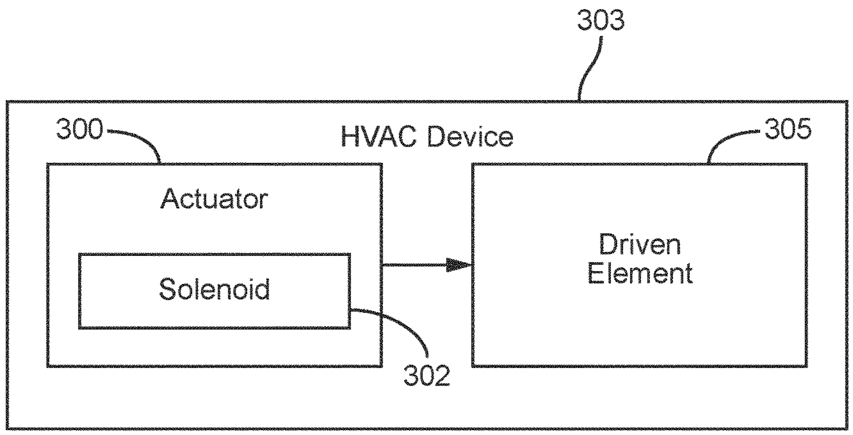
FIG. 2 is a general block diagram of an HVAC device which can be implemented in the HVAC system illustrated in FIG. 1, according to some embodiments.

Referring now to FIG. 2, an HVAC actuator 300 is provided in an HVAC device 303. The HVAC actuator 300 includes a solenoid system 302 configured to achieve costs savings according to some embodiments. The HVAC actuator 300 can be used to provide motion for HVAC equipment, devices, components and systems such as a driven component 305. HVAC device 303 can be any device or component of HVAC system such as HVAC system 100 (FIG. 1). Driven component 305 can be a valve, damper, ventilator, fan, louver, or any other movable component in HVAC system 100. In some embodiments, actuator 300 is employed in a non-HVAC application, (e.g., security device, plant control, industrial line, outdoor equipment, fire suppression devices, locking mechanisms, etc.).

In some embodiments, solenoid system 302 is employed with a power input circuit that can accommodate a wide range of input voltages in a range between 24 VAC to 480 VAC (e.g., 85 VAC-304 VAC). In some embodiments, solenoid system 302 includes control circuitry configured to reduce coil sizes and hence reduce copper usage by employing a feedback and regulation mechanism rectifying or otherwise regulating the voltage/current to the solenoid coil. In some embodiments, solenoid system 302 includes control circuitry configured to reduce coil sizes and hence reduce copper usage by allowing a sufficient initial/inrush current/magnetic field to actuate a solenoid plunger while reducing current after actuation in response to a sensed position of the solenoid plunger, a sensed current though the solenoid, and/or an expected actuation time constant. In some embodiments, solenoid system 302 includes a half-wave rectification with free-wheeling diode control circuit (with optional current-sense and/or voltage feedback within free-wheeling loop/circuit). In some embodiments, solenoid system 302 includes a voltage-to-frequency converter with field effect transistor (FET) circuit (e.g., taking advantage of the linear relationship between frequency and magneto-motive force), or triac/silicon controlled rectifier (SCR) with a feedback control circuit.

Figure 3:
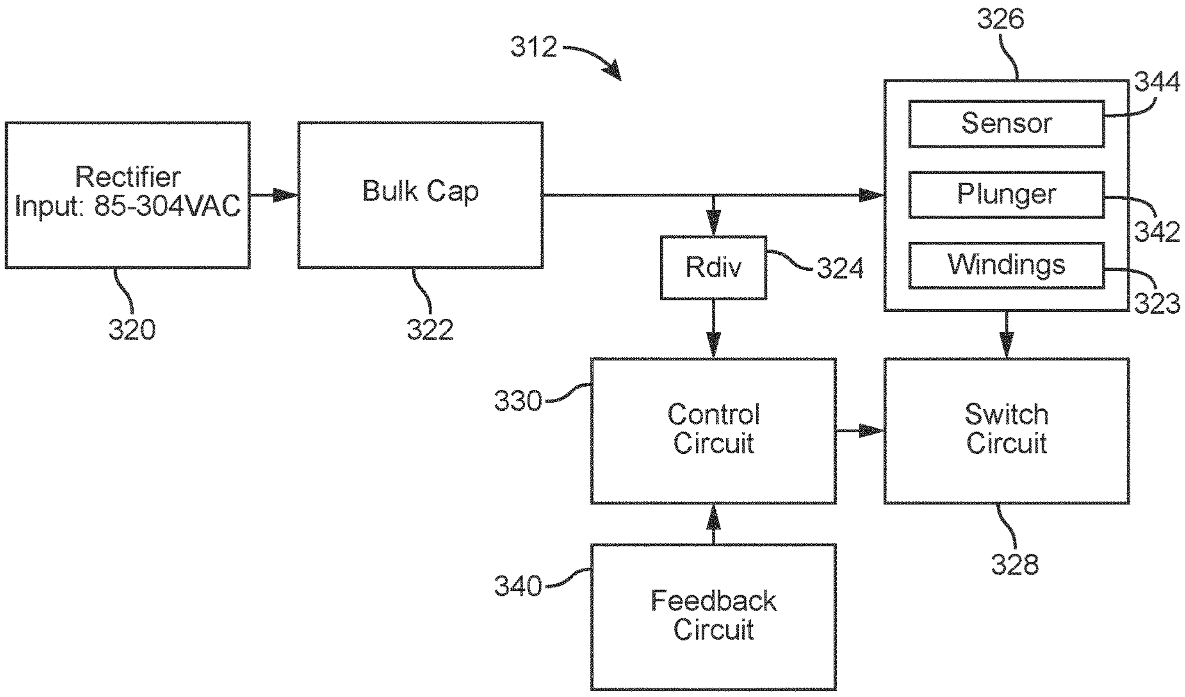
FIG. 3 a general block diagram of an actuator which can be used in the HVAC device illustrated in FIG. 2, according to some embodiments.

Referring now to FIG. 3, a solenoid system 312 can be employed as solenoid system 302 (FIG. 2). Solenoid system 312 includes a rectifier circuit 320, a bulk capacitor 322, a resistive voltage divider circuit 324, a solenoid 326, a switch circuit 328, a control circuit 330, and a feedback circuit 340. Solenoid system 312 receives a power signal at rectifier circuit 320. The rectifier circuit 320 is configured to receive voltages from 85 to 304 VAC and provide a direct current DC voltage suitable for operating solenoid 326 (e.g., 12 VDC, 24 VDC, 48 VDC, etc.).

In some embodiments, solenoid 326 includes copper wires or coils. The wires can be wrapped around a bobbin. In some embodiments, aluminum conductors are used in place of copper conductors for cost reduction. The aluminum wires can have a larger gauge (e.g., with less windings on the bobbin) than the copper wires to keep the bobbin the same size in some embodiments. Solenoid 326 can be a linear device or a rotational device. In some embodiments, solenoid 326 includes a plunger 342 (e.g., a movable metal core provided within the coil or coils of solenoid 326). A position of plunger 342 is monitored by a sensor 344. Sensor 344 is optional and can be an optical sensor, a mechanical sensor, a hall-effect sensor (e.g., measuring overall magnetic field and/or actuator position), a current sensor, or another device for determining a position of plunger 342 to be used in a feedback control scheme for solenoid system 312. Solenoid 326 is a DC solenoid in some embodiments.

Rectifier circuit 320 can be a full wave or half rectifier circuit configured to provide a suitable DC voltage level for solenoid 326 in response to a range for AC voltage inputs. Rectifier circuit 320 is configured to provide a universal voltage input across range associated with HVAC devices in some embodiments. In some embodiments, selectable paths including zener diodes for specific voltage outputs can be provided. In some embodiments, a transformer with selectable turn ratios can be used to provide an AC voltage at a particular level for a variety of inputs. The AC voltage at the particular level is DC power using diodes in some embodiments.

Bulk capacitor 322 is a capacitor for storing DC charge provided by rectifier circuit 320. The voltage at bulk capacitor 322 is provided to solenoid 326 and resistive divider circuit 324. Resistive divider circuit 324 provides a supply voltage for control circuit 330. Resistive divider circuit 324 can also be used to generate an oscillating signal for controlling switch circuit 328. The voltage provided to solenoid 326 from bulk capacitor 322 is at the DC rectified voltage level or just below that level in some embodiments. The bulk capacitor 322 serves to filter and buffer the supply of power to solenoid 326 and resistive divider circuit 324.

Control circuit 330 controls switch circuit 328 to provide current through solenoid 326 and activate and deactivate solenoid 326 (e.g., move plunger 342). Control circuit 330 is a processor based (e.g., microcontroller based) in some embodiments. In some embodiments, control circuit 330 is a flyback controller, or voltage to frequency converter control circuit in some embodiments. Control circuit 330 embodied as a flyback controller is an isolated power converter (e.g., voltage mode control or current mode control). In some embodiments, control circuit 330 ensures that FETs in switch circuit 328 are powered off during power up. In some embodiments, the control circuit 330 is configured to respond to feedback such that the magnetic field of the solenoid 326 is kept relatively constant after actuation. The field is kept constant at a level that provides the appropriate amount of force for the application of the solenoid 326. A secondary winding on the solenoid 326 can provide feedback indicative of the magnetic field.

Control circuit 330 can increase frequency of control signals provided to the switch circuit 328 so that higher frequency current is provided to solenoid 326 to activate the solenoid 326. The frequency is provided in proportion to an input signal to control circuit 330 in some embodiments. The control circuit 330 embodied as a voltage-to-frequency converter and/or pulse amplitude modulation circuit (e.g., non-linear) can provide open loop control in some embodiments. The control circuit 528 can use a 555 timer to drive a transistor to create a pulse signal at varying frequencies. Low voltage differential signaling (LVDS) techniques and electromagnetic compatibility techniques can be used by control circuit 330 top [produced a pulsed or oscillating signal for receipt by switch circuit 328. embodiments. In some embodiments, control circuit 330 is processor, an application specific integrated circuit (ASIC), a field programmable gate array (FPGA) or logic device, or any other type and form of dedicated semiconductor logic or processing circuitry capable of processing or supporting the operations described herein.

Switch circuit 328 includes one or more switching devices (e.g., FETs, insulated gate bipolar transistors (IGBTs), SCRs, triacs, or other switching devices), that control the current provide though solenoid 326. The switch circuit 328 is configured to receive one or more control signals (e.g., pulsed signal or oscillating signal) from control circuit 330 and draw current in response to the control signals from bulk capacitor 322 in some embodiments.

A feedback circuit 340 is optional and can provide feedback signals to control circuit 330. The feedback circuit 340 can receive a position signal or current signal form from sensor 344 indicative of plunger position. When the plunger 342 is activated, power to solenoid 326 is reduced to reduce current through the windings 323 of solenoid 326 because initial/inrush current/magnetic field levels are not necessary after actuation (e.g., once the plunger 342 reaches its end position or full travel position, the current can be decreased). The feedback can be provided based on position, a current level through the coil, and/or an expected actuation time constant. Feedback circuit 340 can provide a position signal, or a current sense signal via a current sense resistor or a secondary winding on the solenoid 426. In some embodiments, the current measured is compared to a nominal limit and foldback is provided when the solenoid reaches saturation and/or plunger position. In some embodiments, the current is reduced before currents greater than overload currents are reached, and thereby the risk of damage is reduced. In some embodiments, foldback is used as a current limiting technique to keep the power dissipation under application limits. In some embodiments, the foldback of the output current in solenoid system 302 potentially reduces the thermal, electrical, and mechanical stresses in circuit components, extending the life of these components. Feedback mechanisms can include optical sensor, a mechanical sensor, a hall-effect sensor (e.g., measuring overall magnetic field and/or actuator position), a current sensor, or another device for determining a position of plunger 342, auxiliary winding(s) on the solenoid bobbin, and/or a current-sense element (i.e. series resistor). Additionally, an infrared transmitter/detector pair can be used to detect plunger position used as control feedback.

Figure 4:
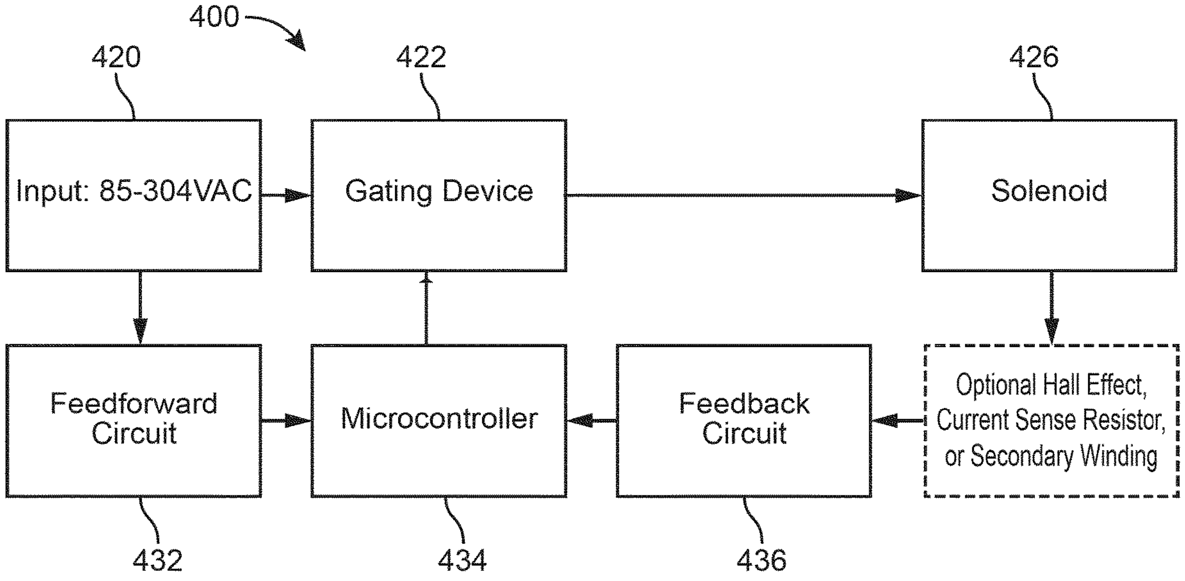
FIG. 4 a general block diagram of an actuator which can be used in the HVAC device illustrated in FIG. 2, according to some embodiments.

Referring now to FIG. 4, a solenoid system 400 can be employed as solenoid system 302 (FIG. 2). Solenoid system 400 includes an AC input 420, a solenoid 426, a control circuit 434, a gating device 422, a feedback circuit 436, and a feed forward circuit 432. Solenoid system 400 receives a power signal at AC input 420. The AC input 420 is configured to receive voltages from 85 to 304 VAC and provide AC voltage via gating device 422 suitable for operating solenoid 426

In some embodiments, solenoid 426 includes copper wires or coils. In some embodiments, aluminum conductors are used in place of copper conductors for cost reduction. Solenoid 426 can be a linear device or a rotational device. In some embodiments, solenoid 426 includes a plunger similar to plunger 342 (FIG. 3). A position of the plunger is monitored by a sensor which can be similar to sensor 344 (FIG. 3) in some embodiments, solenoid 426 is an AC or DC solenoid in some embodiments.

AC input 420 can receive a range for AC voltage inputs. AC input 420 is configured to provide a universal voltage input across the range (e.g., 85 to 304 VAC) associated with HVAC devices in some embodiments.

Control circuit 434 controls gating device 422 to provide current through solenoid 426 and activate and deactivate solenoid 426. Control circuit 434 is a processor based (e.g., microcontroller based control circuit) in some embodiments. Gating device 422 includes one or more switching devices (e.g., FETs, insulated gate bipolar transistors (IGBTs), SCRs, triacs, or other switching devices), that control the current provide though solenoid 426. The gating device 422 is configured to receive one or more control signals from control circuit 434 and draw current from AC input 420 in response to the control signals in some embodiments. In some embodiments, control circuit 434 is processor, an application specific integrated circuit (ASIC), a field programmable gate array (FPGA) or logic device, or any other type and form of dedicated semiconductor logic or processing circuitry capable of processing or supporting the operations described herein.

Control circuit 434 is LVD compliant and responds to feedback to control a triac as the gating device 422 in some embodiments. Triac regulation in response to feedback using dimmer techniques can be utilized. Control circuit 434 responds to feedback to control the gating device 422 and apply a half wave rectified signal to solenoid 426 in some embodiments. In some embodiments, control circuit 434 responds to feedback to turn off gating device 422 using depletion mode or tandem devices when activation is sensed.

In some embodiments, the control circuit 434 adjusts a duty cycle (e.g., pulse width modulation (PWM)) according to the input voltage. The control circuit 434 includes a look up table that provides a duty cycle for a particular input voltage in some embodiments. The control circuit 434 includes a look up table that provides a frequency for a particular input voltage in some embodiments. The control circuit 434 includes a look up table that provides a duty cycle and frequency for a particular input voltage in some embodiments. The input voltage can be sensed or set by a user. In some embodiments, the control circuit 434 reduces the duty cycle or the frequency in response to a feedback signal indicating that the plunger of the solenoid 426 has reached the full travel position. The above described frequency and PWM techniques can be utilized by control circuit 330 (FIG. 3).

Feedback circuit 436 is optional and can provide feedback signals to control circuit 434 similar to feedback circuit 340 (FIG. 3). Feedback circuit 436 can provide a position signal, or a current sense signal via a current sense resistor or a secondary winding on the solenoid 426. Feed forward circuit 432 is optional and can provide feedforward signals to control circuit 434. In some embodiments, the feed forward signals are indicative of the voltage provided to AC input 420 so that control circuit 434 can control gating device in accordance with the voltage level. Feed forward circuit 432 can also be used in solenoid system 312 and provide feed forward signals to control circuit 330 (FIG. 3) or rectifier circuit 320 for adjustments based upon input voltage levels.

Figure 5:
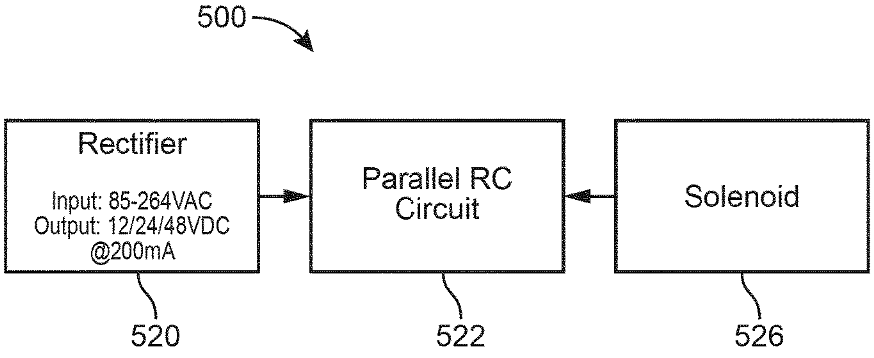
FIG. 5 is a general block diagram of an actuator which can be used in the HVAC device illustrated in FIG. 2, according to some embodiments.

Referring now to FIG. 5, a solenoid system 500 can be employed as solenoid system 302 (FIG. 2). Solenoid system 500 includes a rectifier 520, a solenoid 526, and a parallel resistor capacitor circuit 522. Solenoid system 500 receives a power signal at an AC input for rectifier 520. The rectifier 520 is configured to receive voltages from 85 to 304 VAC and provide AC voltage suitable via a parallel resistor capacitor circuit 522 for operating solenoid 526.

In some embodiments, solenoid 526 includes copper wires or coils. In some embodiments, aluminum conductors are used in place of copper conductors for cost reduction. Solenoid 526 can be a linear device or a rotational device. In some embodiments, solenoid 526 includes a plunger similar to plunger 342 (FIG. 3). A position of the plunger is monitored by a sensor which can be similar to sensor 344 (FIG. 3) in some embodiments. Solenoid 526 is a DC solenoid in some embodiments. Solenoid 526 is wound for nominal steady state current thorough a series resistor in some embodiments.

Rectifier 520 can receive a range for AC voltage inputs. Rectifier 520 is configured to provide a universal voltage input across range associated with HVAC devices in some embodiments. In some embodiments, rectifier 520 can be a full wave or half rectifier circuit configured to provide a suitable DC voltage level for solenoid 526 in response to a range for AC voltage inputs. In some embodiments, selectable paths including zener diodes for specific voltage outputs can be provided. In some embodiments, a transformer with selectable turn ratios can be used to provide an AC voltage at a particular level for a variety of inputs. The AC voltage at the particular level from the transformer is converted into DC power using diodes in some embodiments. In some embodiments, the rectifier 520 receives inputs from 85 VAC to 264 VAC and provides an output at 12 VDC, 24 VDC, or 48 VDC at 200 milliamperes (ma).

The parallel resistor capacitor circuit 522 provides a DC oscillating signal to drive current through the solenoid 526. The oscillating signal can be adjusted to have duty cycles corresponding to the needed magnetic field. The parallel resistor capacitor circuit 522 can be configured as a high pull in, low hold current circuit, thereby reducing power consumption and heat associated with the current though the solenoid 526. The parallel resistor capacitor circuit 522 is configured to provide a consistent/stable/regulated magnetic field/force for solenoid 526 in some embodiments. In some embodiments, the parallel resistor capacitor circuit 522 includes freewheeling diode and is coupled to a half wave rectifier in the rectifier 520.

Figure 6:
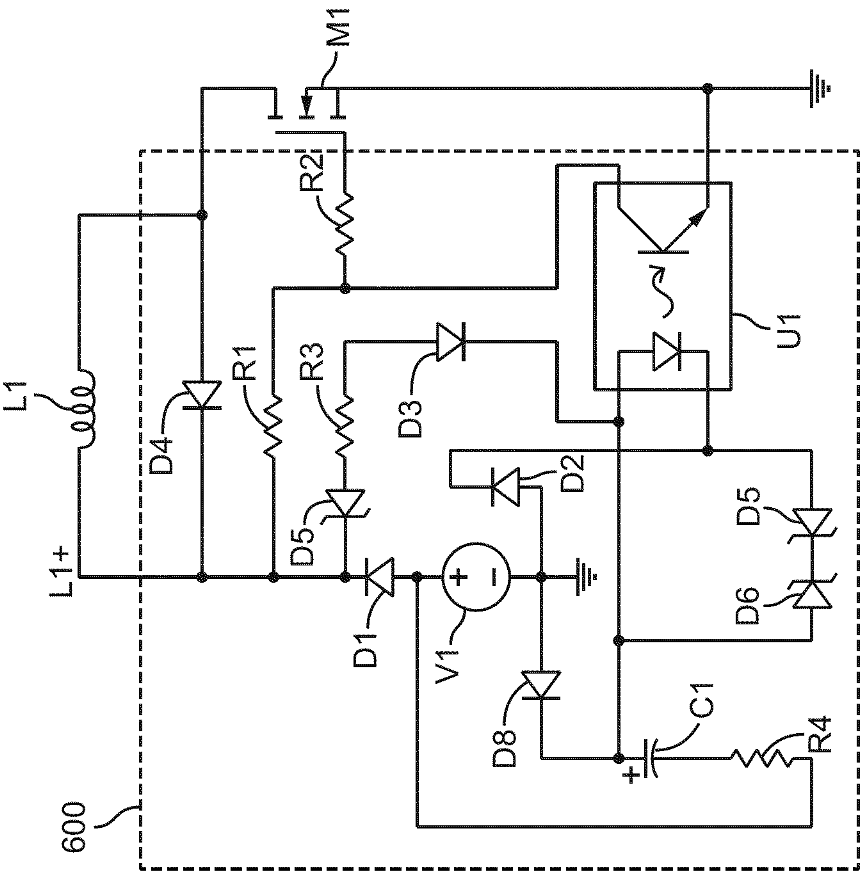
FIG. 6 is an electrical schematic drawing of a control circuit for any of the actuators illustrated in FIGS. 2-5, according to some embodiments.

With reference to FIG. 6, a control circuit 600 can be used to drive current through a coil L1 of a solenoid, such as solenoids 326, 426, and 526 (FIGS. 3-5) using a FET M1 (e.g., N-channel enhancement mode transistor) which can be used as switch circuit 328 or gating device 422 (FIGS. 3-4). A voltage represented by voltage source V1 is provided to activate the solenoid associated with coil L1. A network including a diode D1, a resistor R3, a diode D3, a zener diode D5, a diode D8, a zener diode D2, a capacitor C1 a resistor R4, a zener diode D2 and zener diodes D6 and D7 provides an oscillating signal to optoelectronic isolator U1 using power from voltage source V1. Voltage source V1 is a supply power, and coil L1 is a solenoid in some embodiments. Optoelectronic isolator U1 and FET M1 are a gating device/switch circuit in some embodiments.

Optoelectronic isolator U1 drives FET M1 according to the oscillating signal between a resistor R1 and resistor R2 coupled to the gate of FET M1. A freewheeling diode D4 is provided in parallel with coil L1. Resistor R4 and capacitor C1 provide a time constant for the oscillation signal controlled by optoelectronic isolator U1. Optoelectronic isolator U1 turns FET M1 into a non-conducting state when current is provided from diode D3 through optoelectronic isolator U1 to diode D7.

Figure 7:
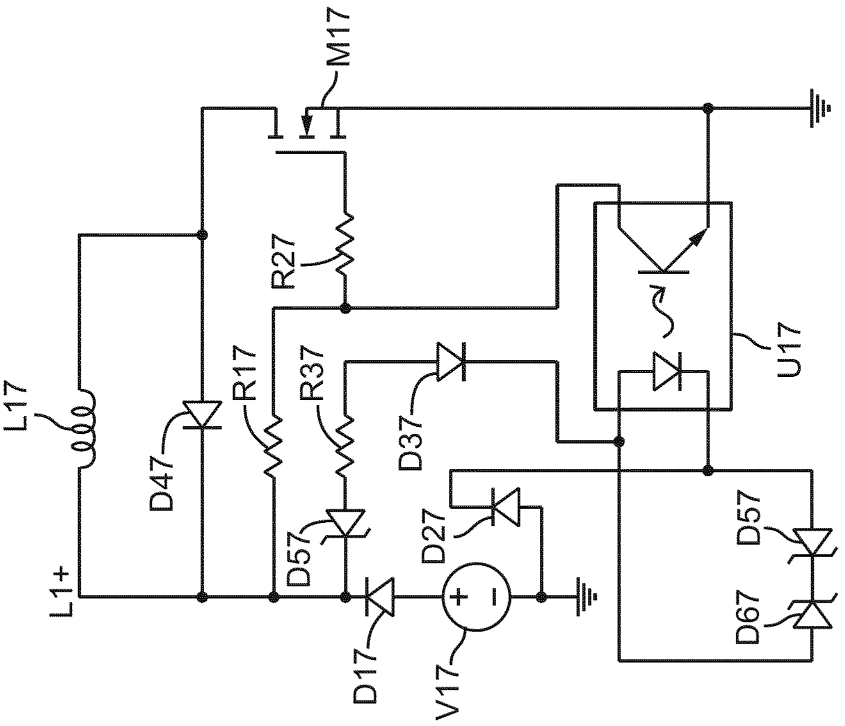
FIG. 7 is an electrical schematic drawing of a control circuit for any of the actuators illustrated in FIGS. 2-5, according to some embodiments.

With reference to FIG. 7, a control circuit 700 can be used to drive current through a coil L17 of a solenoid, such as solenoids 326, 426, and 526 (FIGS. 3-5) using a FET M17 (e.g., N-channel enhancement mode) which can be used as switch circuit 328 or gating device 422 (FIGS. 3-4). A voltage source V17 provides power to activate the solenoid associated with coil L17. A network including a diode D17, a zener diode D57, a resistor R37, a zener diode D37, and a zener diode D67 provides an oscillating signal to optoelectronic isolator U17 using power from the voltage source V17. Optoelectronic isolator U17 drives FET M17 according to the oscillating signal provided between a resistor R27 and resistor R17 coupled to the gate of FET M17. Optoelectronic isolator U17 turns FET M17 into a non-conducting state when current is provided from resistor R37 through optoelectronic isolator U17 to diode D27. A freewheeling diode D47 is provided in parallel with coil L17. Voltage source V17 provides supply power, and coil L17 is the solenoid in some embodiments. Optoelectronic isolator U17 and FET M17 are a gating device/switch circuit in some embodiments.

Figure 8:
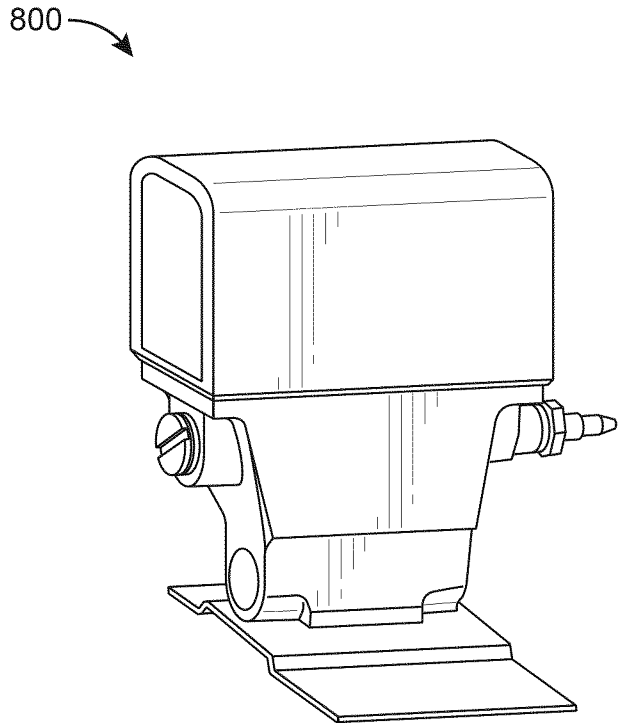
FIG. 8 is a perspective view drawing of an actuator, according to some embodiments.

With reference to FIG. 8, an actuator 800 includes the solenoid systems 312, 400 and 500 (FIGS. 3-5). The actuator 800 is part of an HVAC device such as HVAC device 303 (FIG. 2). In some embodiments, control circuits for actuator 800 can be implemented using an LT1241 pulse width modulator driving an FET with a feedback input coupled to a winding of the solenoid and/or feedback provided via a sense resistor to a sense input.

CONFIGURATION OF EXEMPLARY EMBODIMENTS

As utilized herein with respect to numerical ranges, the terms "approximately," "about," "substantially," and similar terms generally mean +/−10% of the disclosed values, unless specified otherwise. As utilized herein with respect to structural features (e.g., to describe shape, size, orientation, direction, relative position, etc.), the terms "approximately," "about," "substantially," and similar terms are meant to cover minor variations in structure that may result from, for example, the manufacturing or assembly process and are intended to have a broad meaning in harmony with the common and accepted usage by those of ordinary skill in the art to which the subject matter of this disclosure pertains. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

References herein to the positions of elements (e.g., "top," "bottom," "above," "below") are merely used to describe the orientation of various elements in the FIGURES. It should be noted that the orientation of various elements may differ according to other exemplary embodiments, and that such variations are intended to be encompassed by the present disclosure.

The hardware and data processing components used to implement the various processes, operations, illustrative logics, logical blocks, modules and circuits described in connection with the embodiments disclosed herein may be implemented or performed with a general purpose single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some embodiments, particular processes and methods may be performed by circuitry that is specific to a given function. The memory (e.g., memory, memory unit, storage device) may include one or more devices (e.g., RAM, ROM, Flash memory, hard disk storage) for storing data and/or computer code for completing or facilitating the various processes, layers and modules described in the present disclosure. The memory may be or include volatile memory or non-volatile memory, and may include database components, object code components, script components, or any other type of information structure for supporting the various activities and information structures described in the present disclosure. According to an exemplary embodiment, the memory is communicably connected to the processor via a processing circuit and includes computer code for executing (e.g., by the processing circuit or the processor) the one or more processes described herein.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures and description may illustrate a specific order of method steps, the order of such steps may differ from what is depicted and described, unless specified differently above. Also, two or more steps may be performed concurrently or with partial concurrence, unless specified differently above.

What is claimed is:

1. An actuator for a heating ventilating, or air conditioning system, the actuator comprising:
- a rectifier configured to receive any of 120 VAC, 208 VAC, 240 VAC, and 277 VAC power of an alternating current power within a voltage range from 24V to 480V and provide power for operation of a control circuit;
- a solenoid comprising a first coil, a secondary coil, and a plunger, the first coil and the secondary coil comprising aluminum;
- a switch circuit coupled to the first coil; and
- wherein the control circuit coupled to the switch circuit, where in the control circuit is configured to receive a feedback signal representative of a plunger position, the control circuit being configured to provide power to the solenoid via the switch circuit and reduce the power to the solenoid via the switch circuit in response to the feedback signal being representative of the plunger being in a full travel position, wherein the first coil is configured to move the plunger and the secondary coil is configured to provide the feedback signal.

2. The actuator of claim 1, wherein the rectifier is a half wave rectifier.

3. The actuator of claim 1, wherein the actuator is a linear actuator.

4. The actuator of claim 1, wherein the control circuit comprises a voltage to frequency converter.

5. The actuator of claim 1, wherein the control circuit provides foldback when current in the solenoid reaches saturation or the plunger reaches the full travel position.

6. The actuator of claim 1, wherein the first coil is wound with a metal conductor, the metal conductor being a material other than copper.

7. The actuator of claim 1,
wherein the rectifier is a full wave rectifier configured to convert an alternating current input signal to a direct current signal.

8. The actuator of claim 7, wherein the direct current signal is provided to the first coil.

9. A solenoid system a heating ventilating, or air conditioning system, the solenoid system comprising:
an alternating current input configured to receive any of an alternating current input power within a voltage range from 24V to 480V and provide power for operation of a control circuit;
a solenoid comprising a first coil, a secondary coil, and a plunger, the first coil and the secondary coil comprising aluminum;
a switch circuit coupled to the first coil; and
wherein the control circuit coupled to the switch circuit, wherein the control circuit is configured to receive the alternating current input power and provide solenoid power to the solenoid via the switch circuit, wherein the first coil is configured to move the plunger and the secondary coil is configured to provide a feedback signal, the control circuit being configured to provide the solenoid power to the solenoid via the switch circuit and reduce the solenoid power to the solenoid via the switch circuit in response to the feedback signal being representative of the plunger being in a full travel position.

10. The solenoid system of claim 9, wherein the control circuit comprises a micro controller.

11. The solenoid system of claim 9, wherein the solenoid system is disposed in an HVAC actuator configured as a linear actuator.

12. The solenoid system of claim 9, further comprising:
the alternating current input comprises a rectifier coupled to the alternating current input, wherein the rectifier is configured to convert the alternating current input power to a direct current signal, wherein the rectifier is configured to receive the alternating current input power at any of 120 volts, 240 volts, or 85 volts and provide the direct current signal.

13. The solenoid system of claim 12, wherein the control circuit comprises a voltage to frequency converter.

14. The solenoid system of claim 12, wherein the control circuit comprises a microcontroller.

15. The solenoid system of claim 12, wherein the control circuit comprises a flyback controller.

16. The solenoid system of claim 12, wherein the control circuit comprises a parallel resistor capacitor circuit.

17. The solenoid system of claim 12, wherein the control circuit comprises a series resistor capacitor circuit.

18. A heating, ventilation, or air conditioning (HVAC) actuator, the actuator comprising:
a rectifier configured to receive any of 24 VAC, 120 VAC, 208 VAC, and 277 VAC power of an alternating current power within a voltage range from 24V to 480V and provide power for operation of a control circuit;
a solenoid comprising a first coil, a secondary coil and a plunger, wherein the first coil comprises an aluminum conductor;
a switch circuit coupled to the first coil; and
the control circuit coupled to the switch circuit, where in the control circuit is configured to receive a feedback signal, the control circuit being configured to provide power to the solenoid via the switch circuit and reduce the power to the solenoid via the switch circuit in response to the feedback signal to reduce power consumed after in-rush current is received, the first coil is configured to move the plunger and the secondary coil is configured to provide the feedback signal.

19. The actuator of claim 17, wherein the feedback signal representative of a plunger position.

20. The actuator of claim 17, wherein the secondary coil of the solenoid is comprised of a non-copper containing material.

21. The actuator of claim 17, wherein the control circuit provides foldback when current in the solenoid reaches saturation.

* * * * *